(12) United States Patent
Matsushita (10) Patent No.: US 8,172,464 B2
(45) Date of Patent: May 8, 2012

(54) TAPERED ROLLER BEARING

(75) Inventor: Tomoki Matsushita, Iwata (JP)

(73) Assignee: NTN Corporation, Osaka (JP)

( * ) Notice: Subject to any disclaimer, the term of this patent is extended or adjusted under 35 U.S.C. 154(b) by 513 days.

(21) Appl. No.: 12/311,492

(22) PCT Filed: Oct. 30, 2007

(86) PCT No.: PCT/JP2007/071077
§ 371 (c)(1),
(2), (4) Date: Apr. 1, 2009

(87) PCT Pub. No.: WO2008/056562
PCT Pub. Date: May 15, 2008

(65) Prior Publication Data
US 2010/0074569 A1    Mar. 25, 2010

(30) Foreign Application Priority Data

Nov. 9, 2006  (JP) .................................. 2006-304376
Nov. 10, 2006 (JP) .................................. 2006-305416

(51) Int. Cl.
*F16C 33/58* (2006.01)
(52) U.S. Cl. ......................... 384/571; 384/569; 384/572
(58) Field of Classification Search .................. 384/571, 384/569, 470, 572
See application file for complete search history.

(56) References Cited

U.S. PATENT DOCUMENTS

| | | | | |
|---|---|---|---|---|
| 4,523,862 A * | 6/1985 | Yasui et al. | ..................... | 384/564 |
| 4,601,592 A * | 7/1986 | Jatczak et al. | ................. | 384/564 |
| 6,238,095 B1 * | 5/2001 | Ai | ................................. | 384/450 |
| 6,832,971 B2 * | 12/2004 | Yamamoto | ..................... | 475/217 |
| 6,860,640 B2 * | 3/2005 | Matsuyama et al. | .......... | 384/571 |
| 7,435,008 B2 * | 10/2008 | Kawaguchi | ................... | 384/571 |

FOREIGN PATENT DOCUMENTS

| | | |
|---|---|---|
| JP | 39-2705 | 3/1964 |
| JP | 2002-54638 | 2/2002 |
| JP | 2005-98412 | 4/2005 |

OTHER PUBLICATIONS

International Preliminary Report on Patentability and Written Opinion of the International Searching Authority dated May 26, 2009 for International Application No. PCT/JP2007/071077.
International Search Report mailed Jan. 8, 2008 for International Application No. PCT/JP2007/071077.

* cited by examiner

*Primary Examiner* — Patrick MacKey
(74) *Attorney, Agent, or Firm* — Wenderoth, Lind & Ponack, L.L.P.

(57) ABSTRACT

A tapered roller bearing achieves improvement in manufacturability and a longer life. The tapered roller bearing includes an outer ring, an inner ring, a plurality of tapered rollers disposed between raceways of the inner ring and the outer ring. A cage holds each tapered roller. A shoulder section that receives a large end face of the tapered roller is provided on a large-diameter side of the inner ring so as to project towards an outer-diameter side. A raceway that reaches from the shoulder section to the small diameter end is formed. An engaging section that engages with the shoulder section on the inner ring is provided on a large-diameter side of the cage so as to project towards an inner diameter direction. The engaging section is disposed such as to fit within a width of a corresponding pocket when viewed from an axial direction.

12 Claims, 7 Drawing Sheets

TAPERED ROLLER BEARING

TECHNICAL FIELD

The present invention relates to a tapered roller bearing.

BACKGROUND ART

Driving force from an engine of an automobile is transmitted to the wheels through a power transmission system including any or all of a transmission, a propeller shaft, a differential, and a drive shaft.

Figure 6:
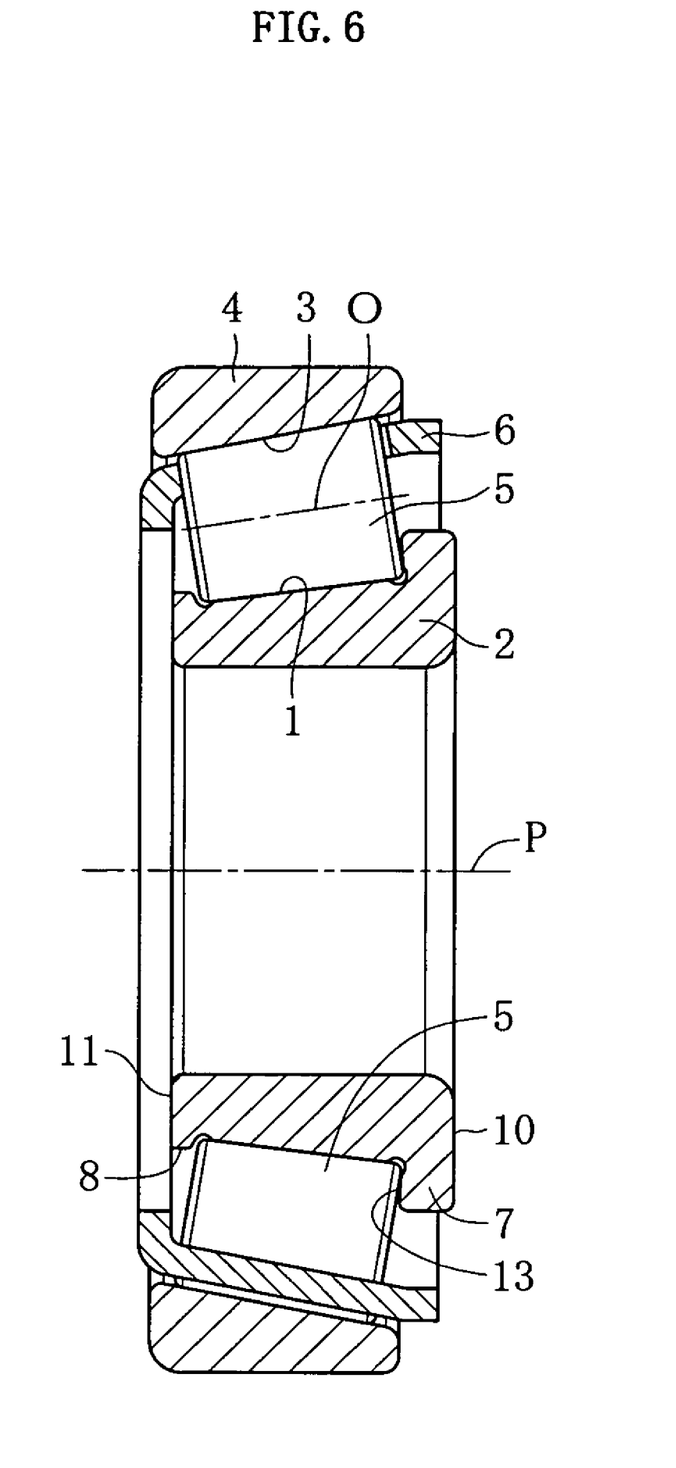
FIG. 6 is a cross-sectional view of a conventional tapered roller bearing.

In the power transmission system, a tapered roller bearing having a high load-carrying capacity for radial load and excellent shock-resistant properties is often used as a bearing that supports a shaft. As shown in FIG. 6, the tapered roller bearing generally includes an inner ring 2, an outer ring 4, a plurality of tapered rollers 5, and a cage 6. The inner ring 2 has a conical raceway 1 on an outer circumferential side. The outer ring 4 has a conical raceway 3 on an inner circumferential side. The tapered rollers 5 are disposed between the inner ring 2 and the outer ring 4 such as to roll freely. The cage 6 holds the tapered rollers 5 at a predetermined interval in a circumferential direction.

Figure 7:
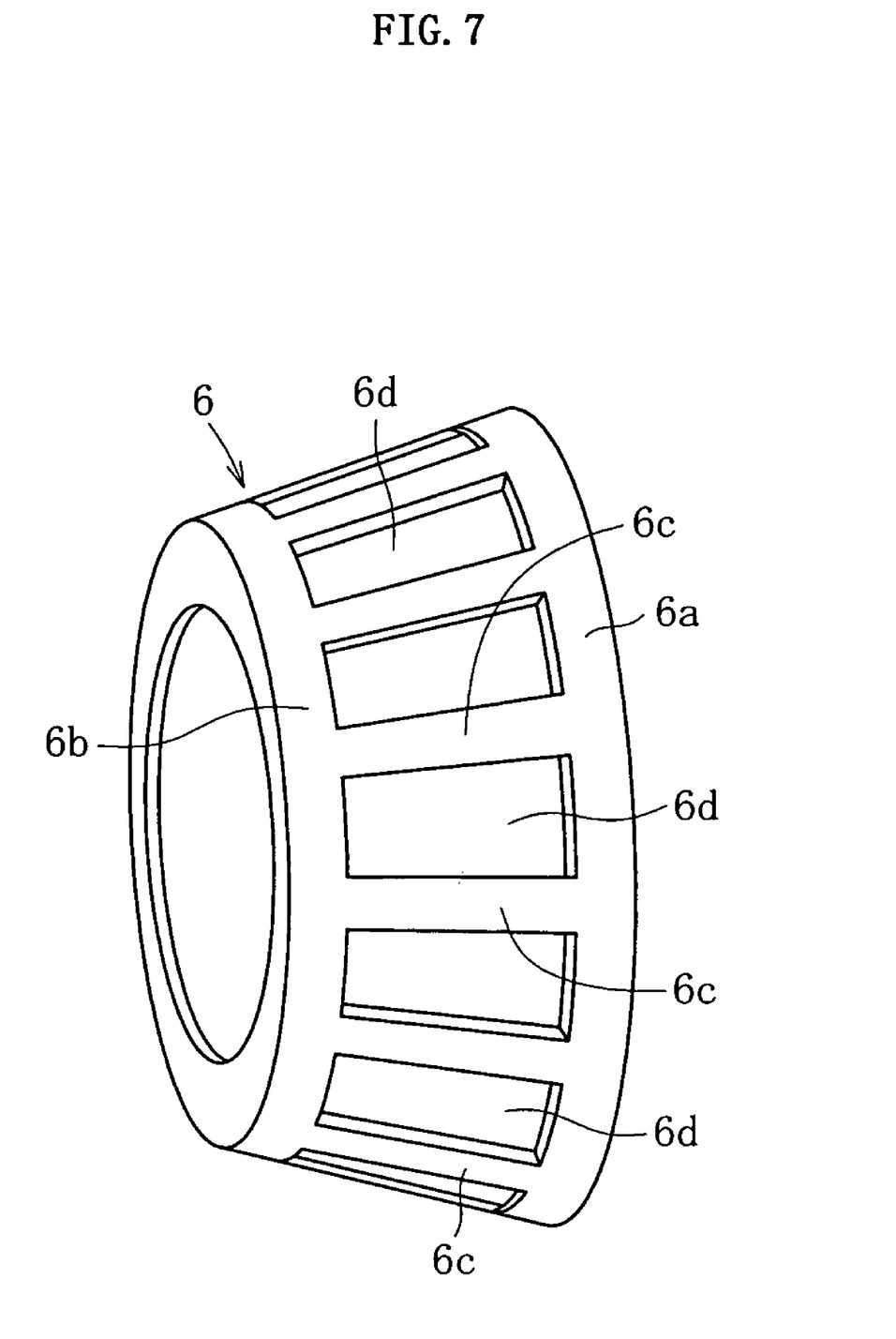
FIG. 7 is a perspective view of a cage in the conventional tapered roller bearing.

As shown in FIG. 7, the cage 6 includes a pair of ring-shaped sections 6a and 6b, and columnar sections 6c that connect the ring-shaped sections 6a and 6b. The tapered rollers 5 are housed in pockets 6d formed between columnar sections 6c that are adjacent along the circumferential direction.

In the tapered roller bearing, the tapered rollers 5, the raceway 1 of the inner ring 2, and the raceway 3 of the outer ring 4 are in linear contact. The tapered roller bearing is designed such that the raceway 1 of the inner ring 2, the raceway 3 of the outer ring 4, and a roller center axis O match at a point (not shown) on an axial center P.

Therefore, when a load is applied, the tapered rollers 5 are pressed towards a large-end side. A shoulder section 7 that projects towards an outer-diameter side is provided on a large-diameter side of the inner ring 2 to receive the load. To prevent the tapered rollers 5 from falling towards a small-end side before the bearing is assembled to a machine and the like, a projecting shoulder section 8 is also provided on the small-end side of the inner ring 2.

As advances are made, such as downsizing the engine room to increase interior space of the vehicle, increasing output from the engine, and increasing stages of the transmission to improve fuel efficiency, the usage environment in which the tapered roller bearing is used is becoming increasingly challenging by the year. To fulfill the life span of the bearing in the usage environment, the life of the bearing is required to be further extended.

Against such a backdrop, a proposal has been made in which the load-carrying capacity is increased from a current load-carrying capacity without changes being made to the dimensions, by the number of rollers being increased or the length of the rollers being increased. As a result, the life of the bearing is extended. However, in a current structure, the shoulder section (small shoulder) 8 is provided on the inner ring on the small-diameter side of the raceway, due to reasons regarding bearing assembly, as described above. Therefore, the shoulder section 8 limits the increase in the length of the tapered rollers 5. Moreover, each tapered roller 5 is held by the cage 6 as described above, and the columnar sections 6c of the cage 56 are interposed between tapered rollers 5 that are adjacent in the circumferential direction. Therefore, the columnar sections 6c limit the increase in the number of tapered rollers 5. In this way, conventionally, the increase in load-carrying capacity is limited.

Conventionally, a bearing is known in which the shoulder section (small shoulder) on the small-diameter side of the inner ring is omitted (Patent Document 1). When the shoulder section on the small-diameter side of the inner ring is omitted, the length of the tapered rollers in an axial direction can be extended by an amount corresponding to the omission. The load-carrying capacity can be increased.

Patent Document 1: Japanese Patent Laid-Open Publication No. 2002-54638

SUMMARY OF THE INVENTION

Problems to be Solved by the Invention

However, when the shoulder section 8 on the small-diameter side of the inner ring 2 is omitted, the tapered rollers 5 fall toward the small-diameter side before the bearing is assembled to a machine and the like. Therefore, in the bearing described in Patent Document 1, a hooking section that engages with the shoulder section 7 on the large-diameter side is provided in the cage to prevent the tapered rollers 5 from falling.

However, because the cage in the bearing described in Patent Document 1 is made of iron, when the hooking section is formed, a bending process for forming the hooking section is required. As the number of manufacturing processes increases, manufacturing cost increases, and the amount of time required for manufacturing increases. Moreover, abrasion powder caused by abrasion is produced in the iron cage. Lubrication may deteriorate because of the abrasion powder.

In the bearing described in Patent Document 1, as described above, the cage is assumed to be made of iron. In a bearing such as this, a main object is to achieve compactness and weight reduction.

In light of the above-described issues, the present invention provides a tapered roller bearing that can achieve improvement in manufacturability and a longer life.

Means for Solving the Problems

According to a first aspect of the invention, a tapered roller bearing includes an outer ring having a conical raceway, an inner ring having a conical raceway, a plurality of tapered rollers disposed between the raceways of the inner ring and the outer ring, and a cage that holds each tapered roller. In the tapered roller bearing, a shoulder section that receives a large end face of the tapered rollers is provided on a large-diameter side of the inner ring such as to project towards an outer-diameter side. A raceway is formed that reaches from the shoulder section to a small diameter end. An engaging section that engages with the shoulder section on the inner ring is provided on a large-diameter side of the cage such as to project towards an inner diameter direction. The engaging section is disposed such as to fit within a width of a pocket at a corresponding position when viewed from an axial direction.

In the tapered roller bearing, the raceway of the inner ring reaches from the shoulder section to the small diameter end. A shoulder section and a relief section conventionally present on the small-diameter side of the inner ring are omitted. Therefore, the raceway can be increased by an amount corresponding to the omitted shoulder section and relief section. Moreover, because the engaging section that engages with the shoulder section on the inner ring is provided on the cage, the tapered rollers can be prevented from falling towards the small-end side. Became the engaging section is disposed such as to fit within the width of a corresponding pocket when viewed from the axial direction, when the cage that is made of resin is formed, the cage can be formed using a mold without being affected by the engaging sections.

According to a second aspect of the invention, a notched section is formed on an outer diameter surface of the shoulder section, and the engaging section of the cage locks onto the notched section. As a result, engagement to the shoulder section side can be improved. Moreover, because the engaging section is disposed such as to fit within the width of a corresponding pocket when viewed from the axial direction, the depth of the notched section to which the engaging section engages can be shallow. Deterioration in strength of the shoulder section can be prevented.

A third aspect of the invention is the first aspect of the invention in which a large shoulder is provided on a large-diameter side end section of an outer circumferential surface of the inner ring to guide each tapered roller. A small-diameter side end section on the outer circumferential surface of the inner ring is open, with no small shoulder provided. The small-diameter end face of the cage and outer circumferential edges of small end faces of the tapered rollers are disposed such as to almost match on a plane perpendicular to a bearing center axis.

A fourth aspect of the invention is the first aspect of the invention in which a large shoulder is provided on a large-diameter side end section of an outer circumferential surface of the inner ring to guide each tapered roller. A small-diameter side end section on the outer circumferential surface of the inner ring is open, with no shoulder section provided. The small-diameter end face of the cage is separated to be further inward than a plane perpendicular to a bearing center axis, passing through an outer circumferential edge of a small end face of the tapered roller.

In the tapered roller bearing according to the third and fourth aspects of the invention, projection of the cage from the end face of the inner ring and the outer ring (end face corresponding to the small-diameter side of the cage) can be eliminated or minimized. As a result, when a double-row tapered roller bearing is configured, each cage can be disposed in positions at which the cages do not interfere with each other.

Furthermore, the large shoulder is only provided in the large-diameter side end section on the outer circumferential surface of the inner ring. The shoulder section (small shoulder) is not provided on the small-diameter side. Therefore, the bearing can be made more compact (particularly in the axial direction) and lighter by an amount corresponding to the small shoulder. Increase in the length of the inner ring in the axial direction can be suppressed while increasing the length of the raceway and the length of the tapered rollers. Therefore, load-carrying capacity of the bearing can be improved.

A fifth aspect of the invention is the third or fourth aspect of the invention in which the engaging section that can engage with the large shoulder on the inner ring is provided on the large-diameter side of the cage. As a result, the tapered rollers hold in the cage can be prevented from falling.

Advantage of the Invention

In the tapered roller bearing of the present invention, the shoulder section on the small-diameter side of the inner roller that is conventionally present is omitted. Therefore, the tapered roller bearing can be made lighter by an amount corresponding to the omitted shoulder section. Moreover, the raceway is increased by an amount corresponding to the omitted shoulder section and relief section on the small-diameter side. As a result, the axial center length of the tapered rollers can be increased, load-carrying capacity can be improved, and lifetime can be extended. Because the engaging section of the cage engages with the shoulder section of the inner ring, the tapered rollers can be prevented from falling towards the small-end side. The inner ring, the tapered rollers, and the cage can be handled as an assembly (an assembled unit). Assembly (manufacturability) of the overall bearing can be enhanced.

Moreover, when the cage that is made of resin is formed, the cage can be formed using a mold without being affected by the engaging section. Therefore, manufacturability can be enhanced. The tapered roller bearing can be stably manufactured with certainty. Because the cage is made of resin, abrasion powder caused by abrasion is not produced. Therefore, deterioration of lubrication caused by the abrasion powder does not occur. Lifetime can be extended.

As a result of the engaging section locking onto the notched section on the shoulder section, engagement of the engaging section to the shoulder section side can be improved. Moreover, the engaging section can be prevented from projecting in an outward axial direction on the large-diameter side of the inner ring. As a result, the tapered roller bearing can be made more compact. The depth of the notched section to which the engaging section engages can be shallow. Deterioration in strength of the shoulder section can be prevented. As a result, insufficient strength of the roller bearing due to the shoulder section can be prevented, and the tapered rollers can be stably received.

Compared to a cage made of an iron plate, the resin cage is lighter. The resin cage is also self-lubricating and has a low coefficient of friction. Therefore, together with the effects of a lubricant present within the bearing, the resin cage can prevent abrasion caused by contact with the outer ring. Moreover, because the resin cage is self-lubricating and has a small coefficient of friction, the resin cage is suitable for reducing torque loss during bearing start-up and wear in the cage.

DETAILED DESCRIPTION OF THE INVENTION

A first embodiment of the present invention will be described with reference to FIG. 1 to FIG. 3. A second embodiment will thereafter be described with reference to FIG. 4. Lastly, a third embodiment will thereafter be described with reference to FIG. 5.

Figure 1:
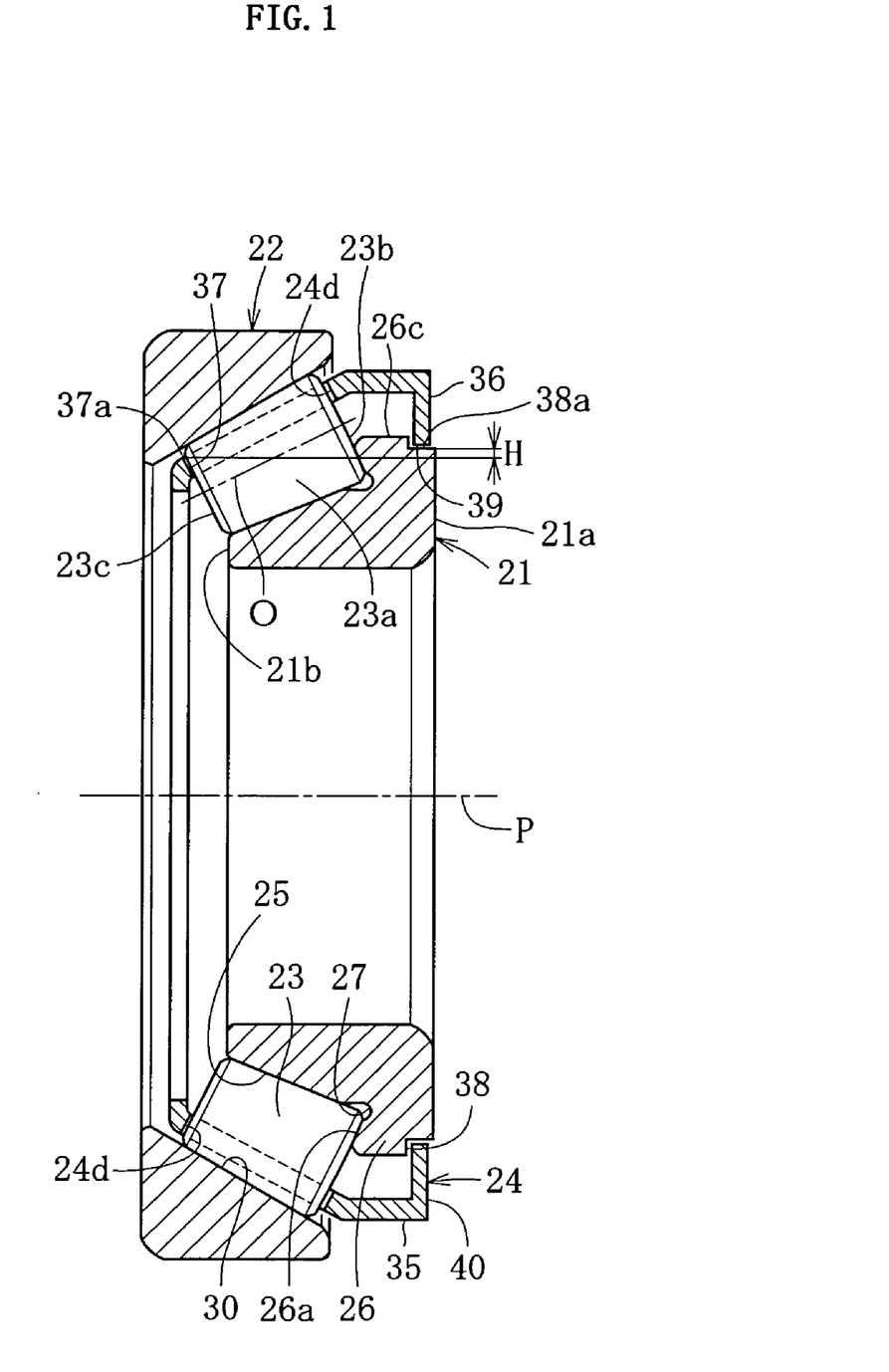
FIG. 1 is a cross-sectional view of a tapered roller bearing according to an embodiment of the present invention.

FIG. 1 is a diagram of a tapered roller bearing of the present invention. The tapered roller bearing includes an inner ring 21, an outer ring 22, a plurality of tapered rollers 23, and a cage 24. The tapered rollers 23 are disposed between the inner ring 21 and the outer ring 22 such as to roll freely. The cage 24 is made of resin and holds the tapered rollers 23 at a predetermined interval in a circumferential direction.

The inner ring 21 has a conical raceway 25 on an outer diameter surface. A shoulder section 26 that projects towards the outer-diameter side is formed on a large-diameter side of the raceway 25. In other words, the raceway 25 is formed from the shoulder section 26 to a small diameter end. Unlike the inner ring of a conventional tapered roller bearing, a shoulder section is not provided on the small-diameter side. A relief section 27 is formed in a corner section between the raceway 25 and the shoulder section 26. The shoulder section 26 in this instance is a large shoulder that receives axial load applied through the tapered rollers 23 and guides the rotation of the tapered rollers 23. The small shoulder that is conventionally provided does not serve a special purpose during bearing rotation. Therefore, components such as the small shoulder are omitted in the present invention.

An inner surface (namely an end face on the small-diameter side) 26a of the shoulder 26 is tilted by a predetermined angle in relation to a plane that is perpendicular to a bearing center line P. In other words, as shown in FIG. 1, an angle formed by the raceway 25 and the inner surface 26a of the shoulder section 26 is set to match an angle formed by a peripheral wall 23a of the tapered roller 23 such that, when the tapered roller 23 is fitted into the raceway 25 of the inner ring 21, the peripheral wall 23a of the roller 23 comes into contact with the raceway 25 and a large end face 23b of the tapered roller 23 comes into contact with the inner surface 26a of the shoulder section 26.

The outer ring 22 has a conical raceway 30 on an inner diameter surface. The plurality of tapered rollers 23 held by the cage 24 rolls over the raceway 30 and the raceway 25 of the inner ring 21.

Therefore, because the inner ring 21 does not have the shoulder section on the small-diameter side, a small end face 23c of the tapered roller 23 can be extended to a small-diameter side end face 21b of the inner ring 21, as shown in FIG. 1.

Figure 2:
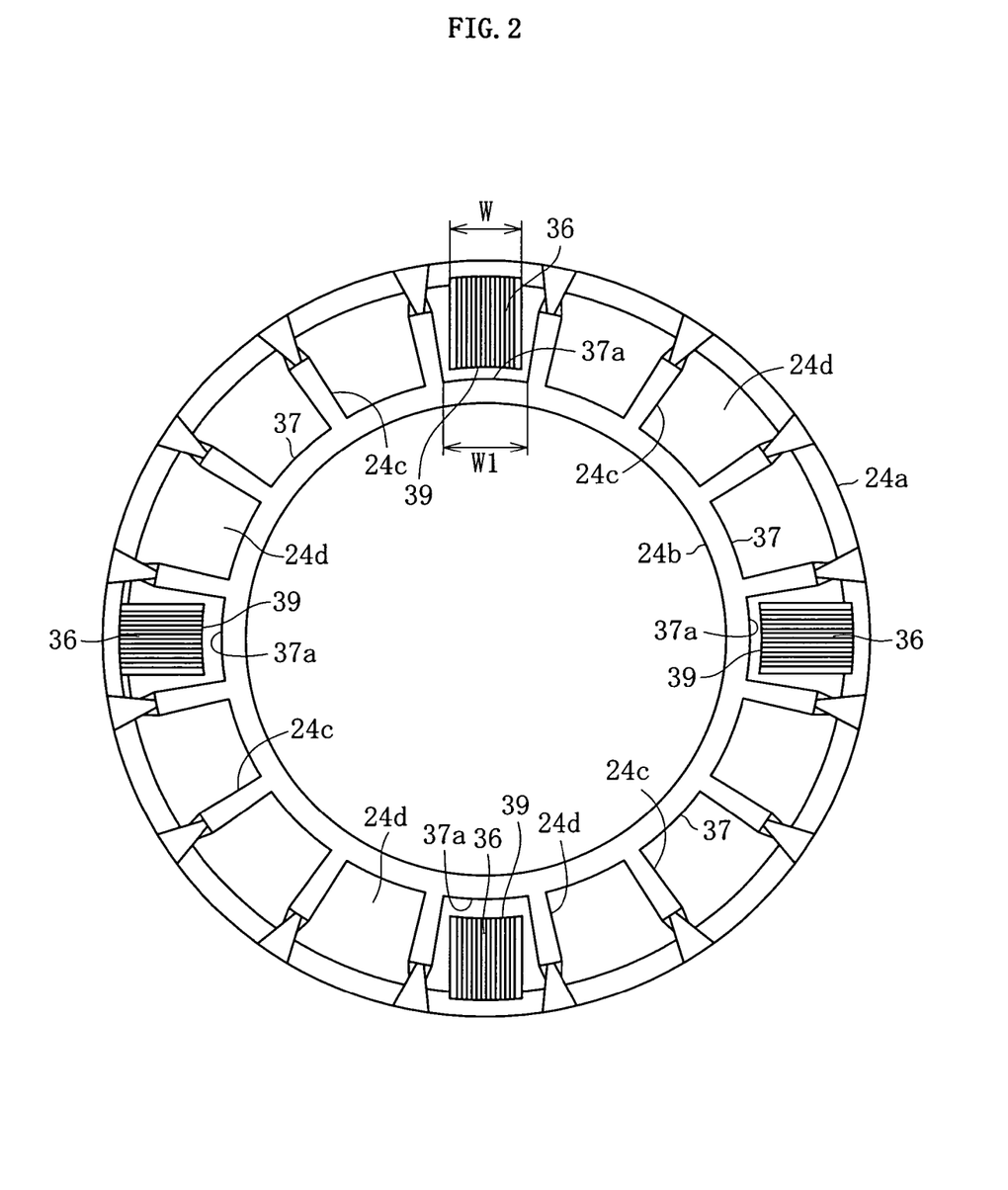
FIG. 2 is a front view of a cage in the tapered roller bearing.
Figure 3:
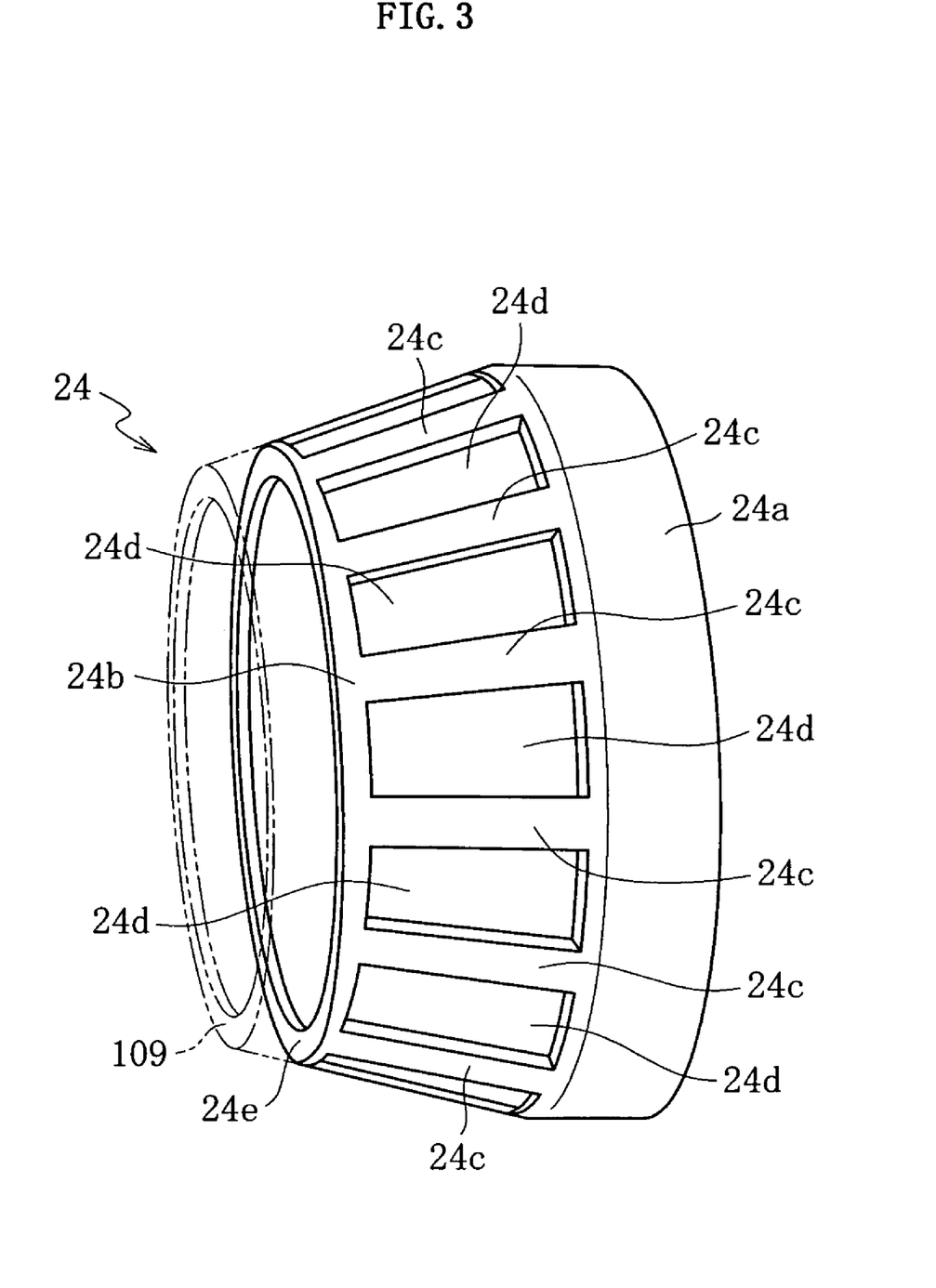
FIG. 3 is a perspective view of the cage in the tapered roller bearing.

As shown in FIG. 1 to FIG. 3, the cage 24 includes a pair of ring-shaped sections 24a and 24b, namely a large-diameter side ring-shaped section 24a and a small-diameter side ring-shaped section 24b. The cage 24 also includes a plurality of columnar sections 24c that extend in a roller center axis O direction and connects the ring-shaped sections 24a and 24b. The columnar sections 24c are disposed in an evenly spaced state in the circumferential direction. A single tapered roller 23 is housed such as to rotate freely in each pocket 24d partitioned by columnar sections 24c and 24c that are adjacent in the circumferential direction.

The large-diameter side ring-shaped section 24a includes a large diameter, short cylinder section 35 and an engaging section 36 that projects towards an inner diameter direction. The engaging section 36 is disposed in four locations at a 90 degree pitch along a circumferential direction. As shown in FIG. 2, each engaging section 36 is of a size fitting within a width of a corresponding pocket 24d and overlaps the corresponding pocket 24d when viewed from an axial direction. In this case, an inner diameter end 39 of the engaging section 36 is positioned closer to the outer-diameter side than an outer diameter edge 37a of an inner-diameter side 37 of the pocket 24d. A width W of the engaging section 36 is set to be smaller than a minimum width W1 of the pocket 24d.

A notched section 38 is formed on the large-diameter side of an outer diameter surface 26c of the shoulder section 26 of the inner ring 21. The engaging section 36 is engaged with the notched section 38. Therefore, the inner diameter end 39 of the engaging section 36 is positioned closer to the outer-diameter side than the outer diameter edge 37a of the inner-diameter side 37 of the pocket 24d and positioned closer to the inner-diameter side than the outer diameter surface 26c of the shoulder section 26 of the inner ring 21. In this case, a notch inner diameter end 38a of the notched section 38 is formed closer to the outer-diameter side than the outer diameter edge 37a of the inner-diameter side 37 of the pocket 24d by a distance of gap H. An outer surface 40 of the engaging section 36 does not project further outward in an axial center direction than an end face 21a of the inner ring 21 on the large-diameter side.

A plate thickness of the small-diameter side ring-shaped section 24b of the cage 24 is preferably thinner than that of a conventional small diameter ring-shaped section. A phantom line in FIG. 3 indicates a conventional small diameter ring-shaped section 109 in which the plate thickness is slightly exaggerated. As a result of the plate thickness of the small diameter ring-shaped section 24b being reduced in this way, a small-diameter side end face of the cage 24 and an outer circumferential edge of a small end face of the tapered roller 23 can be disposed such as to almost match on the plane perpendicular to the bearing center axis P. A configuration such as this is particularly effective in a double-row tapered roller bearing to configure a compact bearing in which interference between cages is prevented.

The cage 24 is preferably made of engineering plastic. Engineering plastic refers to a synthetic resin that primarily has excellent heat-resistant properties and can be used in fields requiring strength. Resin having further enhanced heat-resistant properties and strength is referred to as super engineering plastic. Classification is made in terms of marketing strategy, rather than as technical classification. In general, resin having a heat resistance of 100 degrees or more and has a constant mechanical strength is referred to as an engineering plastic. Engineering plastic is represented by the top five general-purpose engineering plastics, such as polyacetal (POM), polyamide (PA), polycarbonate (PC), modified-polyphenylene ether (m-PPE), polybutylene terephthalate (PBT). Glassfiber reinforced polyethylene terephthalate (GF-PET) and ultra-high molar mass polyethylene (UHPE) are also classified as engineering plastics. Resin having a heat resistance of 150 degrees or more, among the engineering plastics, is referred to as a super engineering plastic. Super engineering plastic can also be used in the cage 24. Super engineering plastic is represented by polyarylate (PAR), polysulfone (PSF), polyether sulfone (PES), polyphenylene sulfide (PPS), polyether ether ketone (PEEK), polyimide (PI), polyether imide (PEI), fluorocarbon resin, liquid crystal polymer (LCP), and the like.

Next, an assembly method of the tapered roller bearing will be described. First, a tapered roller 23 is housed in each pocket 24d of the cage 24. Then, the inner ring 21 is pressed into the inner circumference of the cage 24. The outer ring 22 is fitted onto the outer circumference of each tapered roller 23 while being pressed in an axial direction. The engaging section 36 of the cage 24 is engaged with the notched section 38 by being elastically deformed. At this time, a small space is present between the engaging section 36 and the notched section 38 in the axial direction and a radial direction. Therefore, the cage 24 can be slightly moved in the axial direction and the radial direction.

The tapered rollers 23 tend to fall towards the small-end side because of its own weight, before the tapered roller bearing is assembled to a machine. Because of this tendency, pressing force is applied to the cage 24 in the same direction. In accompaniment, because the engaging section 36 engages with the notched section 38 provided on the inner ring 21 from the large-end side, further displacement of the cage 24 towards the small-end side is restricted. In this instance, displacement of the tapered rollers 23 towards the small-end side is restricted by the inner-diameter sides 37 of the pockets 24d. Therefore, the tapered rollers 23 can be prevented from falling from the inner ring 21 with certainty.

In the tapered roller bearing of the present invention, the raceway 25 of the inner ring 21 reaches from the shoulder section 26 to the small diameter end. The shoulder section on the small-diameter side of the inner ring that is conventionally present is omitted. Therefore, weight can be reduced by an amount equivalent to the omitted shoulder section. Moreover, the raceway is increased by an amount equivalent to the omitted shoulder section and relief section on the small-diameter side. As a result, an axial center length of the tapered roller can be increased, and the load-carrying capacity can be improved. Lifetime can be extended. Because the engaging section 36 that engages with the shoulder section 26 of the inner ring 21 is provided on the cage 24, the tapered rollers 23 can be prevented from falling toward the small-end side. The inner ring 21, the tapered rollers 23, and the cage 24 can be handled as an assembly (an assembled unit). Assembly (manufacturability) of the overall bearing can be enhanced.

Moreover, because the engaging section 36 is disposed to fit within the width of the corresponding pocket 24d when viewed from the axial direction, when the cage 24 is formed, the cage 24 can be formed using a mold without being affected by the engaging sections 36. Therefore, manufacturability can be enhanced, and the tapered roller bearing can be stably manufactured with certainty. Because the cage 24 is made of resin, abrasion powder caused by abrasion is not generated. Deterioration in lubrication caused by the abrasion powder does not occur. Lifetime can be extended.

As a result of the engaging section 36 locking with the notched section 38 of the shoulder section 26, engagement of the engaging section 36 to the shoulder section side can be improved. Moreover, the engaging section 36 can be prevented from projecting in an outward axial direction on the large-diameter side of the inner ring 21. As a result, the tapered roller bearing can be made more compact. The engaging section 36 is disposed to fit within the width of the corresponding pocket 24d when viewed from the axial direction. Therefore, a depth of the notched section 38 to which the engaging section 36 engages can be shallow. Deterioration in strength of the shoulder section 26 can be prevented. As a result, insufficient strength of the roller bearing due to the shoulder section 26 can be prevented, and the tapered rollers can be stably received.

The resin cage does not require operations, such as bottom widening and crimping, to be performed during assembly of the bearing. Therefore, required dimensional accuracy can be easily ensured. Compared to a cage made of an iron plate, the resin cage is lighter. The resin cage is also self-lubricating and has a low coefficient of friction. Therefore, together with the effects of a lubricant present within the bearing, the resin cage can prevent abrasion caused by contact with the outer ring. Moreover, because the resin cage is self-lubricating and has a small coefficient of friction, the resin cage is suitable for reducing torque loss during bearing start-up and wear in the cage.

Next, a double-row tapered roller bearing according to a second embodiment will be described with reference to FIG. 4. In the double-row tapered roller bearing, thickness of a small diameter ring-shaped section of a cage is reduced. The double-row tapered roller bearing is particularly suitable for use in a power transmission system (such as a differential) of an automobile. The tapered roller bearing includes inner rings 2A and 2B, outer rings 1A and 1B, a plurality of tapered rollers 23A and 23B, and cages 24A and 24B. The inner rings 2A and 2B are fixed onto a shaft (not shown), such as a drive shaft or a propeller shaft, and have conical raceways 5a and 5b on the outer circumference. The outer rings 1A and 1B are fixed onto a housing (not shown) and have conical raceways 6a and 6b on the inner circumference. The tapered rollers 23A and 23B are interposed between the raceways of the inner rings 2A and 2B, and the outer rings 1A and 1B. The cages 24A and 24B hold the plurality of tapered rollers 23A and 23B at even intervals in the circumferential direction. A spacer 13 and a spacer 14 are respectively mounted between the inner rings 2A and 2B and between the outer rings 3A and 3B. Ring-shaped large shoulders 26A and 26B are formed on the large-end side of the outer circumference of the inner rings 2A and 2B. In this type of tapered roller bearing, both ends in the axial direction are often sealed by a sealing device. However, the sealing device is not shown.

Figure 4:
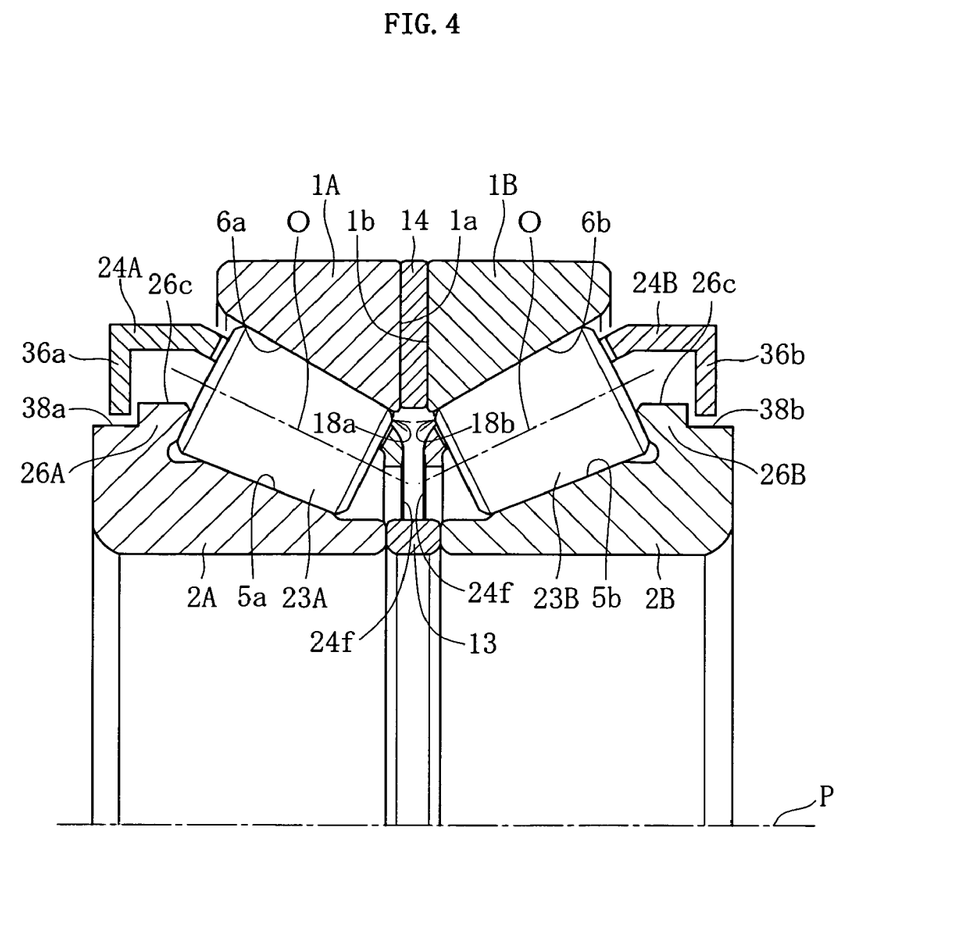
FIG. 4 is a cross-sectional view of main components in a tapered roller bearing according to a variation embodiment of the present invention.

In the double-row tapered roller bearing in FIG. 4, an amount by which small-diameter side end faces 24f and 24f of the pair of cages 24A and 24A project in the axial direction can be reduced. In other words, in the present invention, the projection of the cages 24A and 24B from the end face of the outer rings 1A and 1B (end face corresponding to the small-diameter side of the cages) can be minimized or eliminated. The small-diameter side end faces 24f of the cages 24, and the outer circumferential edges 18a and 18b of the small end face of the tapered rollers 23 can be disposed such as to almost match on a plane perpendicular to the bearing center axis P.

As a result, interference between opposing cages in the double-row tapered roller bearing, and interference with a partner component, such as a housing, in a single-row tapered roller bearing can be prevented. Therefore, mountability of the bearing (assembly with other components) is excellent. Because the axial direction length of the tapered rollers can be increased, net rated load can be increased because of the extended length. Moreover, because the small shoulder in the inner ring is omitted, the dimension of the bearing in the axial direction can be reduced, and weight can be reduced. In addition, the load-carrying capacity can be improved as a result of the extension in the length of the tapered rollers. Furthermore, a pre-load can be stably applied to the bearing. Internal gaps do not easily occur even when the load is applied. Rigidity can be improved. When the tapered roller bearing is used in a power transmission system of an automobile, the power transmission system can be made more compact and lighter. Fuel efficiency and the like can be achieved. Moreover, the engaging section of the cage can prevent the tapered rollers from falling. Therefore, assembly can be enhanced.

Figure 5:
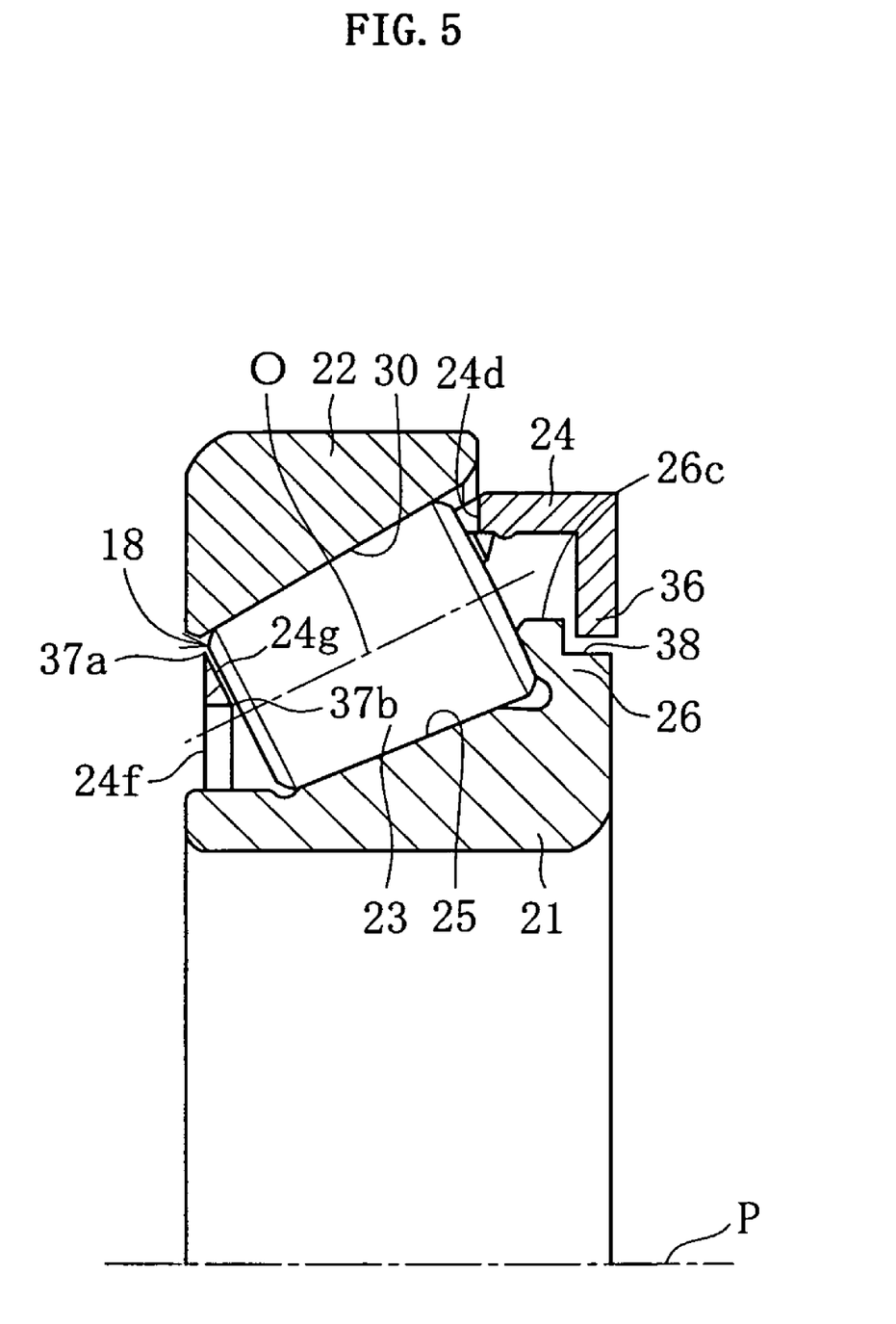
FIG. 5 is a cross-sectional view of main components in a tapered roller bearing according to another variation embodiment of the present invention.

Next, a third embodiment of the present invention will be described with reference to FIG. 5. According to the third embodiment, a short side 24g on a small-diameter side of the pocket 24d is a tapered surface that tilts to a large-diameter side, from the outer diameter edge 37a towards the inner diameter edge 37b. The small-diameter side end face 24f extends from the outer-diameter end side of the outer diameter end edge (tapered surface).

Therefore, the cage 24 does not project from the end face of the outer ring 22. Effects similar to those achieved by the tapered roller bearing according to the first embodiment can be achieved. In particular, because the small-diameter side end face 24f of the cage 24 does not project in the outward axial direction from the end face of the outer ring 22, when a double-row tapered roller bearing is configured, interference between the cages 24 can be prevented with certainty. Assembly is further enhanced.

In the explanation above, an example is given in which the tapered roller bearing is used in a power transmission system, such as a differential. However, the tapered roller bearing can be used for other purposes, such as for supporting a main shaft in a machine tool. Similar effects as those described above can also be achieved in this instance.

The embodiments of the present invention are described above. However, the present invention is not limited to the embodiments. Various modifications can be made. For example, the number of engaging sections 36 is not limited to four, and can be increased or decreased arbitrarily. However, to stably prevent the tapered rollers 23 from falling, three or more engaging sections 36 are preferably disposed at uneven intervals in the circumferential direction. The notched section 38 according to the embodiments opens onto the end face 21a on the large-diameter side of the inner ring 21. However, the notched section 38 can be configured as a ring-shaped recessing groove that is formed on the outer diameter surface 26c of the shoulder section 26, without opening onto the end face 21a. Moreover, the number of pockets in the cage can be variably changed depending on the number of tapered rollers to be held. The length and thickness dimensions and the like of the columnar sections of the cage can also be variably changed as long as the tapered rollers can be held.

The tapered roller bearing of the present invention can be used in various areas conventionally using tapered roller bearings. The tapered roller bearing is preferably used, in particular, in the differential and the transmission in automobiles because the tapered roller bearing can handle increased torque and increased stages of the engine.

The invention claimed is:

1. A tapered roller bearing comprising:
an outer ring having a conical raceway;
an inner ring having a conical raceway;
a plurality of tapered rollers disposed between the conical raceways of the inner ring and the outer ring; and
a cage that holds the tapered rollers,
wherein the inner ring has a large-diameter side with a shoulder section that projects towards an outer-diameter side of the tapered roller bearing, the shoulder section receiving a large end face of each of the tapered rollers,
wherein the conical raceway of the inner ring reaches from the shoulder section to a small diameter end of the inner ring, and
wherein the cage has a large-diameter side with an engaging section that projects towards an inner diameter direction, the engaging section for engaging with the shoulder section on the inner ring, the engaging section having a width that fits within a width of a pocket and being positioned to overlap the pocket when viewed from an axial direction.

2. The tapered roller bearing according to claim 1, wherein
an outer diameter surface of the shoulder section has a notched section formed thereon, and
the engaging section of the cage locks onto the notched section.

3. The tapered roller bearing according to claim 1, wherein
the shoulder section includes a large shoulder that is provided on a large-diameter side end section of the large-diameter side of an outer circumferential surface of the inner ring to guide the tapered rollers,
a small-diameter side end section of the outer circumferential surface of the inner ring is open, with no small shoulder provided thereon, and
a small-diameter end face of the cage and outer circumferential edges of small end faces of the tapered rollers are disposed such as to almost match on a plane perpendicular to a bearing center axis.

4. The tapered roller bearing according to claim 1, wherein
the shoulder section includes a large shoulder that is provided on a large-diameter side end section of the large-diameter side of an outer circumferential surface of the inner ring to guide the tapered rollers,
a small-diameter side end section of the outer circumferential surface of the inner ring is open, with no shoulder section provided thereon, and
a small-diameter end face of the cage is further inward than a plane perpendicular to a bearing center axis that passes through an outer circumferential edge of a small end face of one of the tapered rollers.

5. The tapered roller bearing according to claim 3, wherein the engaging section is for engaging with the large shoulder on the inner ring.

6. The tapered roller bearing according to claim 4, wherein the engaging section is for engaging with the large shoulder on the inner ring.

7. A tapered roller bearing comprising:
an outer ring having a conical raceway;
an inner ring having a conical raceway;
a plurality of tapered rollers disposed between the conical raceways of the inner ring and the outer ring; and
a cage having a plurality of pockets for holding the tapered rollers,
wherein the inner ring has a large-diameter side with a shoulder section that projects towards an outer-diameter side of the tapered roller bearing, the shoulder section receiving a large end face of each of the tapered rollers,
wherein the conical raceway of the inner ring reaches from the shoulder section to a small diameter end of the inner ring, and
wherein the cage has a large-diameter side with an engaging section that projects towards an inner diameter direction, the engaging section for engaging with the shoulder section on the inner ring, the engaging section having a width that fits within a width of one of the pockets and being positioned to overlap the one of the pockets when viewed from an axial direction.

8. The tapered roller bearing according to claim 7, wherein
an outer diameter surface of the shoulder section has a notched section formed thereon, and
the engaging section of the cage locks onto the notched section.

9. The tapered roller bearing according to claim 7, wherein
the shoulder section includes a large shoulder that is provided on a large-diameter side end section of the large-diameter side of an outer circumferential surface of the inner ring to guide the tapered rollers,
a small-diameter side end section of the outer circumferential surface of the inner ring is open, with no small shoulder provided thereon, and
a small-diameter end face of the cage and outer circumferential edges of small end faces of the tapered rollers are disposed such as to almost match on a plane perpendicular to a bearing center axis.

10. The tapered roller bearing according to claim 7, wherein
the shoulder section includes a large shoulder that is provided on a large-diameter side end section of the large-diameter side of an outer circumferential surface of the inner ring to guide the tapered rollers, a small-diameter side end section of the outer circumferential surface of the inner ring is open, with no shoulder section provided thereon, and a small-diameter end face of the cage is further inward than a plane perpendicular to a bearing center axis that passes through an outer circumferential edge of a small end face of one of the tapered rollers.

11. The tapered roller bearing according to claim 9, wherein the engaging section is for engaging with the large shoulder on the inner ring.

12. The tapered roller bearing according to claim 10, wherein the engaging section is for engaging with the large shoulder on the inner ring.

\* \* \* \* \*